US010405180B2

(12) United States Patent
Yang (10) Patent No.: US 10,405,180 B2
(45) Date of Patent: Sep. 3, 2019

(54) STUB NETWORK ESTABLISHING METHOD, DEVICE AND SYSTEM, AND STORAGE MEDIUM (71) Applicant: ZTE CORPORATION, Guangdong (CN)

(72) Inventor: Kun Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/559,243

(22) PCT Filed: Nov. 17, 2015

(86) PCT No.: PCT/CN2015/094838
§ 371 (c)(1),
(2) Date: Sep. 18, 2017

(87) PCT Pub. No.: WO2016/145900
PCT Pub. Date: Sep. 22, 2016

(65) Prior Publication Data
US 2018/0084421 A1  Mar. 22, 2018

(30) Foreign Application Priority Data

Mar. 17, 2015  (CN) .......................... 2015 1 0118206

(51) Int. Cl.
H04W 12/00 (2009.01)
H04W 12/06 (2009.01)
H04W 4/70 (2018.01)
H04W 4/06 (2009.01)
H04W 4/08 (2009.01)

(52) U.S. Cl.
CPC ............. *H04W 12/06* (2013.01); *H04W 4/06* (2013.01); *H04W 4/08* (2013.01); *H04W 4/70* (2018.02)

(58) Field of Classification Search
CPC ......... H04W 12/06; H04W 4/70; H04W 4/06; H04W 4/08
See application file for complete search history.

(56) References Cited

U.S. PATENT DOCUMENTS

| 2012/0004003 A1* | 1/2012 | Shaheen | ................. | H04W 4/08 |
| | | | | 455/509 |
| 2013/0003972 A1* | 1/2013 | Kang | .................... | H04W 12/04 |
| | | | | 380/270 |

(Continued)

FOREIGN PATENT DOCUMENTS

| CN | 102130773 A | 7/2011 |
| CN | 102238201 A | 11/2011 |

(Continued)

OTHER PUBLICATIONS

Extended Supplementary European Search Report dated Dec. 6, 2017 received in European Patent Application No. 15 88 5269.9.

(Continued)

*Primary Examiner* — Khai M Nguyen
(74) *Attorney, Agent, or Firm* — Scully, Scott, Murphy & Presser, P.C.

(57) ABSTRACT

Disclosed is a method for establishing a stub network, including: sending a networking request message to an M2M platform; receiving a networking confirmation message sent from the M2M platform, wherein the networking confirmation message comprises networking authorization information; sending a domain-join request for joining a domain to an M2M terminal which has authorized networking according to the networking authorization information; receiving a domain-join confirmation returned by the M2M terminal which has authorized networking and establishing a link for the M2M terminal which has authorized networking; receiving from an M2M terminal in the domain a data forwarding request which comprises identification of a tar- (Continued)

get M2M terminal; and determining the target M2M terminal as an M2M terminal in the domain according to the identification of the target M2M terminal, and directly forwarding service data to the target M2M target terminal. Also disclosed is a device and system for establishing a stub network.

10 Claims, 6 Drawing Sheets

(56) References Cited

U.S. PATENT DOCUMENTS

| | | | |
|---|---|---|---|
| 2013/0346504 A1 | 12/2013 | Huang et al. | |
| 2014/0369251 A1 | 12/2014 | Zhang | |
| 2016/0007138 A1* | 1/2016 | Palanisamy | H04W 4/70 455/41.2 |
| 2017/0041231 A1* | 2/2017 | Seed | H04W 4/70 |

FOREIGN PATENT DOCUMENTS

| | | |
|---|---|---|
| CN | 102238486 A | 11/2011 |
| CN | 102256211 A | 11/2011 |
| CN | 102685839 A | 9/2012 |
| CN | 103685210 A | 3/2014 |
| CN | 104081796 A | 10/2014 |
| EP | 2 894 912 A1 | 7/2015 |
| WO | WO 2012/080414 A2 | 6/2012 |
| WO | 2012/106619 A1 | 8/2012 |
| WO | 2014/036902 A1 | 3/2014 |
| WO | WO 2014/079019 A1 | 5/2014 |

OTHER PUBLICATIONS

International Search Report dated Feb. 24, 2016 issued in PCT/CN2015/094838.

* cited by examiner

Fig. 7

STUB NETWORK ESTABLISHING METHOD, DEVICE AND SYSTEM, AND STORAGE MEDIUM

CROSS-REFERENCE TO RELATED APPLICATION

This application is based upon and claims priority to PCT Application No. PCT/CN2015/094838, filed Nov. 17, 2015, which is based upon and claims priority to Chinese Patent Application No. 201510118206.9, filed Mar. 17, 2015, the entire contents of which are incorporated herein by reference.

TECHNICAL FIELD

The present disclosure relates to Machine-to-Machine/Man (M2M) technologies, and more particularly, to a method, device and system for establishing a stub network based on an M2M gateway and a storage medium.

BACKGROUND

From point of view of logical functions, M2M communication networks can be divided into three layers: a sense extension layer, a network/service layer and an application layer.

The sense extension layer mainly realizes collection, automatic identification and intelligent control of physical world information. The main components in the sense extension layer include M2M terminals, such as bar code readers, RFID readers, near field communication (NFC) terminals, video terminals, location terminals, intelligent terminals, and sensor monitoring networks.

The network/service layer supports transmission, routing and control of the sense layer information, and provides supports for men-to-thing communications and thing-to-ting communications in Internet of things. Combined with the Internet of things classification, the network level specifically includes the network forms as follows: communication networks, Internet, industry networks and so on. The main components in the network/service layer include M2M service platforms.

The application layer contains a variety of specific Internet of things applications, including both public services and industry services. The industry services can be both public services for the public sectors and industry-specific services which can meet industry's specific application needs. The main components in the application include M2M application servers, simply referred to as M2M applications.

In practice, there are M2M applications with large number of terminals, large forwarding of service data and high real-time requirements. These applications may take up a lot of network resources and even cause network congestion, and it is difficult to meet real-time requirements.

This section provides background information related to the present disclosure which is not necessarily prior art.

SUMMARY

In order to solve the problems in related arts, the present disclosure provides a method, device and system for establishing a stub network based on an M2M gateway and a storage medium.

The technical solutions of embodiments of the present disclosure are as follows.

According to an embodiment of the present disclosure, there is provided a method for establishing a stub network based on a Machine-to-Machine/Man (M2M) gateway. The method includes the following steps.

An M2M gateway sends a networking request message to an M2M platform.

The M2M gateway receives a networking confirmation message sent from the M2M platform. The networking confirmation message includes networking authorization information.

The M2M gateway sends a domain-join request for joining a domain to an M2M terminal which has authorized networking according to the networking authorization information.

The M2M gateway receives a domain-join confirmation returned by the M2M terminal which has authorized networking and confirms to join the domain and establishing a link for the M2M terminal which has authorized networking.

The M2M gateway receives from an M2M terminal in the domain a data forwarding request which includes identification of a target M2M terminal.

The M2M gateway determines the target M2M terminal as an M2M terminal in the domain according to the identification of the target M2M terminal, and directly forwarding service data to the target M2M terminal.

According to an embodiments of the present disclosure, there is provided a method for establishing a stub network based on a Machine-to-Machine/Man (M2M) gateway. The method includes the following steps.

An M2M platform receives a networking request message sent from a M2M gateway.

The M2M platform forwards the networking request message to an M2M application.

The M2M platform forwards a networking confirmation message sent from the M2M application to the M2M gateway. The networking confirmation message includes networking authorization information.

According to an embodiments of the present disclosure, there is provided a method for establishing a stub network based on a Machine-to-Machine/Man (M2M) gateway. The method includes the following steps.

The M2M gateway sends a networking request message to an M2M platform.

The M2M platform forwards the networking request message to an M2M application.

The M2M application sends a networking confirmation message to the M2M platform. The networking confirmation message includes networking authorization information.

The M2M platform forwards the networking confirmation message to the M2M gateway.

The M2M gateway sends a domain-join request for joining a domain to an M2M terminal which has authorized networking according to the networking authorization information.

The M2M terminal which has authorized networking checks the domain-join request, and sends a domain-join confirmation to the M2M gateway.

The M2M gateway establishes a link for the M2M terminal which has authorized networking.

If the M2M terminal needs to send service data to a target M2M terminal, the M2M terminal sends a data forwarding request to the M2M gateway. The data forwarding request includes identification of the target M2M terminal.

The M2M gateway receives the data forwarding request which is sent by the M2M terminal in the domain and includes identification of the target M2M terminal, determines the target M2M terminal as an M2M terminal in the domain according to the identification of the target M2M terminal and directly forwards the service data to the target M2M terminal.

According to an embodiments of the present disclosure, there is provided Machine-to-Machine/Man (M2M) gateway, including:

a processor; and a memory for storing instructions executable by the processor.

The processor is configured to:

send a networking request message to an M2M platform;

receive a networking confirmation message sent from the M2M platform, wherein the networking confirmation message includes networking authorization information;

send a domain-join request for joining a domain to an M2M terminal which has authorized networking according to the networking authorization information;

receive a domain-join confirmation returned by the M2M terminal which has authorized networking and establish a link for the M2M terminal which has authorized networking;

receive from an M2M terminal in the domain a data forwarding request which includes identification of a target M2M terminal; and determine the target M2M terminal as an M2M terminal in the domain according to the identification of the target M2M terminal, and directly forward service data to the target M2M terminal.

According to an embodiment of the present disclosure, there is provided a Machine-to-Machine/Man (M2M) platform, including:

a processor; and a memory for storing instructions executable by the processor.

The processor is configured to:

receive a networking request message sent from a M2M gateway;

forward the networking request message to an M2M application;

receive a networking confirmation message sent from the M2M application, the networking confirmation message including networking authorization information; and forward the networking confirmation message sent from the M2M application to the M2M gateway.

According to an embodiment of the present disclosure, there is provided a system for establishing a stub network based on a Machine-to-Machine/Man (M2M) gateway, including an M2M terminal, an M2M gateway, an M2M platform and an M2M application.

The M2M terminal is configured to: check a domain-join request and send a domain-join confirmation to the M2M gateway; if it is needed to send service data to a target M2M terminal, send a data forwarding request to the M2M gateway. The data forwarding request includes identification of the target M2M terminal.

The M2M gateway is configured to: send a networking request message to the M2M platform, send a domain-join request for joining a domain to an M2M terminal which has authorized networking according to networking authorization information in the networking confirmation message, and after receive a domain-join confirmation, establish a link for the M2M terminal which has authorized networking; receive from the M2M terminal a data forwarding request which includes identification of the target M2M terminal, determine the target M2M terminal as an M2M terminal in the domain according to the identification of the target M2M terminal, and directly forward service data to the target M2M target terminal.

The M2M platform is configured to: forward the networking request message to the M2M application, and forwarding the networking confirmation message sent by the M2M application to the M2M gateway.

The M2M application is configured to: send the networking confirmation message to the M2M platform. The networking confirmation message includes the networking authorization information.

In the method, device, system for establishing a stub network based on an M2M gateway and a storage medium provided by embodiments of the present disclosure, the M2M gateway sends a networking request message to an M2M platform. The M2M gateway receives a networking confirmation message sent from the M2M platform, and the networking confirmation message includes networking authorization information. The M2M gateway sends a domain-join request for joining a domain to an M2M terminal which has authorized networking according to the networking authorization information, receives a domain-join confirmation returned by the M2M terminal which has authorized networking and establishes a link for the M2M terminal which has authorized networking. The M2M gateway receives from an M2M terminal in the domain a data forwarding request which includes identification of a target M2M terminal. The M2M gateway determines the target M2M terminal as an M2M terminal in the domain according to the identification of the target M2M terminal, and directly forwards service data to the target M2M target terminal. In this way, direct forwarding of service data between M2M terminals in a stub network may be realized using an M2M gateway, thereby improving system operation efficiency and meeting real-time requirements.

This section provides a summary of various implementations or examples of the technology described in the disclosure, and is not a comprehensive disclosure of the full scope or all features of the disclosed technology.

DETAILED DESCRIPTION

In an embodiment of the present disclosure, an M2M gateway sends a networking request message to an M2M platform. The M2M gateway receives a networking confirmation message sent from an M2M platform, and the networking confirmation message includes networking authorization information. The M2M gateway sends a domain-join request for joining a domain to an M2M terminal which has authorized networking according to the networking authorization information, receives a domain-join confirmation returned by the M2M terminal which has authorized networking and establishes a link for the M2M terminal which has authorized networking. The M2M gateway receives from an M2M terminal in the domain a data forwarding request which includes identification of a target M2M terminal. The M2M gateway determines the target M2M terminal as an M2M terminal in the domain according to the identification of the target M2M terminal, and directly forwards service data to the target M2M target terminal.

The present disclosure will be described in detail below with reference to drawings and exemplary embodiments.

First Embodiment

Figure 1:
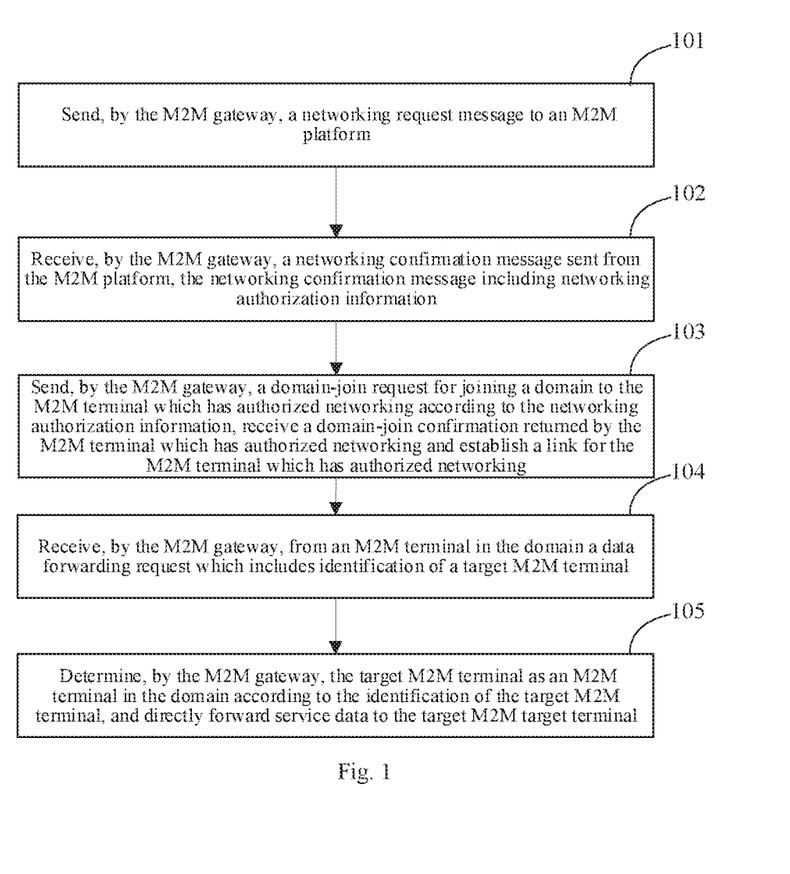
FIG. 1 is a flowchart showing a method for establishing a stub network based on an M2M gateway according to an embodiment of the present disclosure.

The embodiment of the present disclosure realizes a method for establishing a stub network based on an M2M gateway. As shown in FIG. 1, the method includes the following steps.

In step 101, the M2M gateway sends a networking request message to an M2M platform.

The networking request message may include identification of an M2M terminal which requests networking.

In step 102, the M2M gateway receives a networking confirmation message sent from the M2M platform. The networking confirmation message includes networking authorization information. The networking authorization information may include identification of an M2M terminal which has authorized networking and an authorization certificate.

In step 103, the M2M gateway sends a domain-join request for joining a domain to the M2M terminal which has authorized networking according to the networking authorization information, receives a domain-join confirmation returned by the M2M terminal which has authorized networking and confirms to join the domain and establishes a link for the M2M terminal which has authorized networking.

The M2M gateway may establish a link for the M2M terminal which has authorized networking, such as a Bluetooth link, an infrared link, a WiFi link, a Zigbee link and the like.

In step 104, the M2M gateway receives from an M2M terminal in the domain a data forwarding request which includes identification of a target M2M terminal.

In step 105, the M2M gateway determines the target M2M terminal as an M2M terminal in the domain according to the identification of the target M2M terminal, and directly forwards service data to the target M2M target terminal.

Here, the M2M gate determines whether the target M2M terminal is an M2M terminal in the domain according to the identification of the target M2M terminal in the data forwarding request.

In step 105, if the M2M determines that the target M2M is not an M2M terminal in the domain according to the identification of the target M2M terminal, the M2M gateway reports the service data to the M2M platform which performs outside-domain forwarding (the M2M platform forwards the service data outside the domain).

In an exemplary embodiment, in order to enable the M2M application to conduct the same service operations on M2M terminals at the same time to reduce consumption of network resources and improve system operation efficiency, in step 102, the networking confirmation message further includes group configuration information of a group which is established by the M2M platform for M2M terminals having the same service capability. The group configuration information includes identification assigned to the group, identification of group members and identification of the M2M gateway which the group is affiliated with.

Accordingly, the M2M gateway further receives a group service request which is sent by an M2M application and forwarded by the M2M platform. The group service request includes the identification of the group and the identification of the M2M gateway. According to the group identification in the group service request, the M2M gateway searches identification of group members from locally stored group configuration information, and distributes the group service request to the group members according to the found identification of the group members. After receiving service responses fed by the group members, according to operation execution results indicated by the service response message, the M2M gateway processes the group service request distributed to the group members.

1) If the operation result indicates that the operation is performed successfully, the M2M gateway records the operation execution result of the group members.

2) If the operation result indicates that the operation is failed, the M2M resends the service request according to a resending policy.

The M2M gateway assembles service responses fed by the group members, and feeds the assembled group service response to the M2M application. The group service response includes an operation execution result indication, for example, success, failure, or no response.

Embodiments of the present disclosure further provide a first computer readable storage medium, including a set of instructions, which are configured to perform the method for establishing a stub network based on a Machine-to-Machine/Man (M2M) gateway according to the first embodiment.

Second Embodiment

Figure 2:
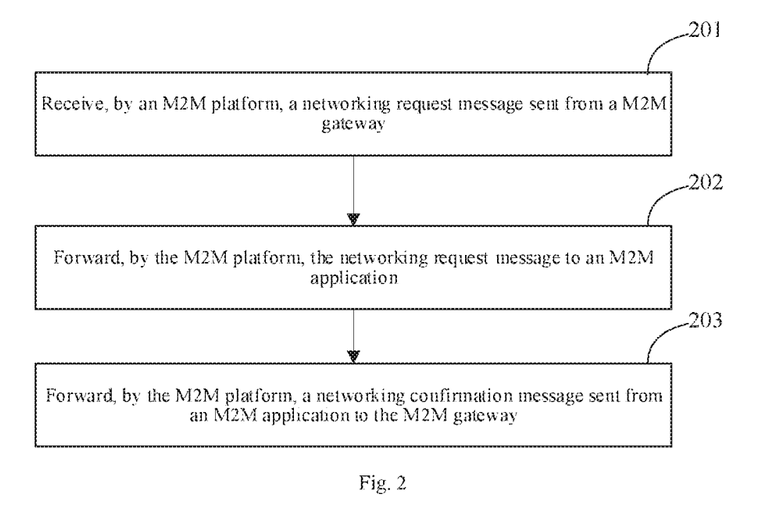
FIG. 2 is a flowchart showing a method for establishing a stub network based on an M2M gateway according to an embodiment of the present disclosure.

The embodiment of the present disclosure provides a method for establishing a stub network based on an M2M gateway. As shown in FIG. 2, the method includes the following steps.

In step 201, an M2M platform receives a networking request message sent from a M2M gateway.

The networking request message includes identification of an M2M terminal which requests networking.

In step 202, the M2M platform forwards the networking request message to an M2M application.

The method may further include: performing authentication and authorization with respect to the M2M gateway by the M2M platform. Specifically, the M2M platform retrieves basic data of the M2M gateway from locally stored information according to the identification of the M2M gateway, and determines whether the access of the M2M gateway is approved and whether the M2M gateway has the service permission to forward data according to the basic data of the M2M gateway.

In step 203, the M2M platform forwards a networking confirmation message sent from an M2M application to the M2M gateway. The networking confirmation message includes networking authorization information.

In the embodiment, the method may further include: receiving, by the M2M platform, service data reported by the M2M gateway and performing outside-domain forwarding for the service data.

In an exemplary embodiment, in order to enable the M2M application to conduct the same service operations on M2M terminals at the same time to reduce consumption of network resources and improve system operation efficiency, according to the networking authorization information in the networking confirmation message sent from the M2M application, the M2M platform retrieves basic data of M2M terminals which has authorized networking, creates a group for M2M terminals having the same capability, and sends a group update message to the M2M application. The update message includes group configuration information. The networking authorization information may include identification of an M2M terminal which has authorized networking and an authorization certificate. The group configuration information includes identification assigned to the group, identification of group members and identification of the M2M gateway which the group is affiliated with. The M2M platform carries the group configuration information in the networking confirmation message and sends the networking confirmation message to the M2M gateway.

In addition, the M2M platform receives a group service request which is sent by the M2M application according to the group configuration information, and forwards the group service request to the M2M gateway according to the identification of the M2M gateway in the group service request. The group service request may include the identification of the group and the identification of the M2M gateway.

Embodiments of the present disclosure further provide a second computer readable storage medium, including a set of instructions, which are configured to perform the method for establishing a stub network based on an M2M gateway according to the second embodiment.

Third Embodiment

Figure 3:
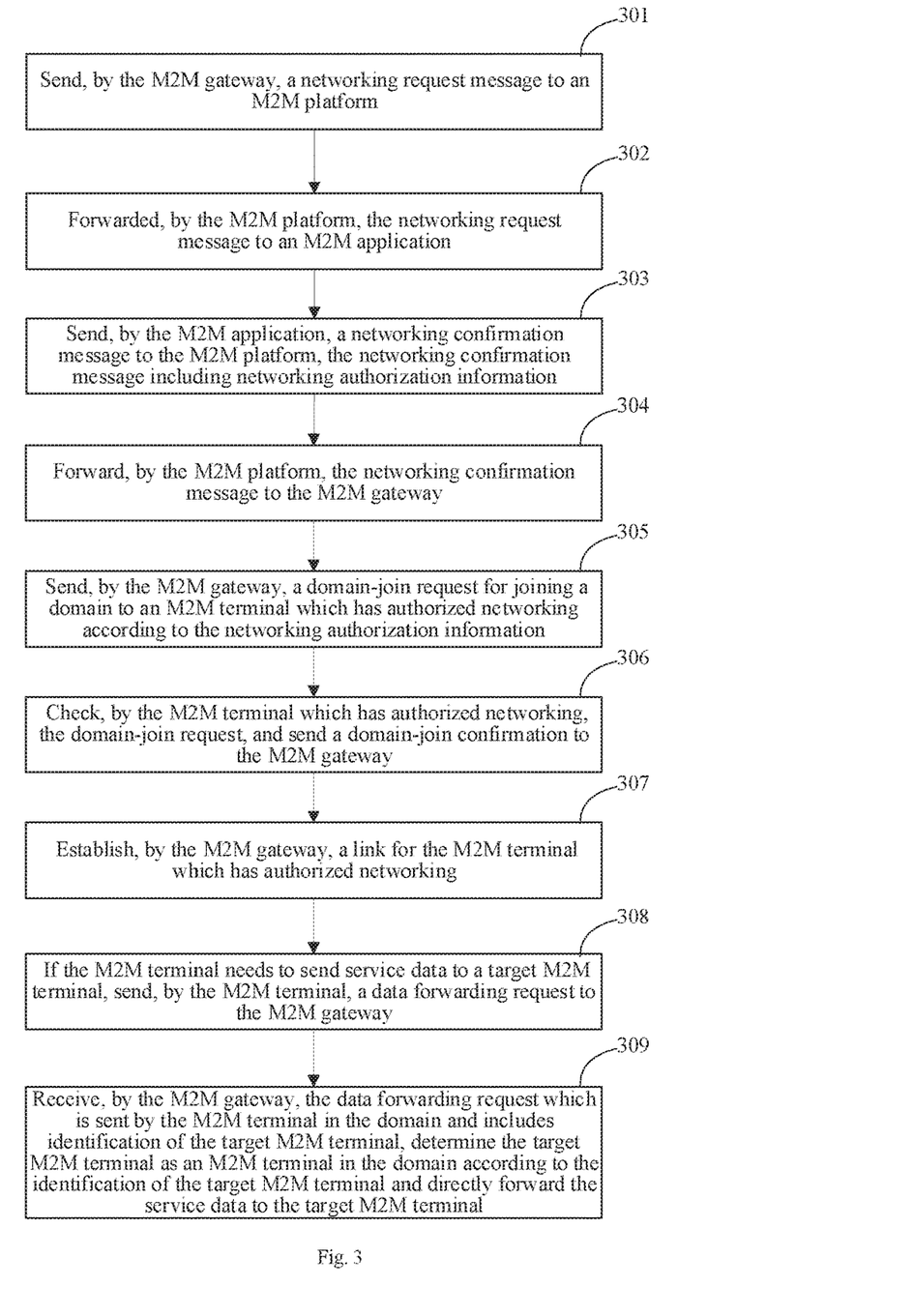
FIG. 3 is a flowchart showing a method for establishing a stub network based on an M2M gateway according to an embodiment of the present disclosure.

The embodiment of the present disclosure provides a method for establishing a stub network based on an M2M gateway. As shown in FIG. 3, the method includes the following steps.

In step 301, the M2M gateway sends a networking request message to an M2M platform.

The networking request message includes identification of an M2M terminal which requests networking.

In step 302, the M2M platform forwards the networking request message to an M2M application.

The method may further include: performing authentication and authorization with respect to the M2M gateway by the M2M platform.

In step 303, the M2M application sends a networking confirmation message to the M2M platform. The networking confirmation message includes networking authorization information. The networking authorization information may include identification of an M2M terminal which has authorized networking and an authorization certificate.

The step may further include: performing authentication and authorization with respect to the M2M gateway by the M2M application. Specifically, the M2M application retrieves subscription data of the M2M gateway from locally stored information according to the identification of the M2M gateway, determines whether the access of the M2M gateway is approved, and authorizes the networking request according to the service permission of the M2M gateway in the subscription data.

In step 304, the M2M platform forwards the networking confirmation message to the M2M gateway.

In step 305, the M2M gateway sends a domain-join request for joining a domain to an M2M terminal which has authorized networking according to the networking authorization information.

In step 306, the M2M terminal which has authorized networking checks the domain-join request, and sends a domain-join confirmation to the M2M gateway.

Here, the check may be performed according to the authorization certificate in the domain-join request.

In step 307, the M2M gateway establishes a link for the M2M terminal which has authorized networking.

In step 308, if the M2M terminal needs to send service data to a target M2M terminal, the M2M terminal sends a data forwarding request to the M2M gateway. The data forwarding request includes identification of the target M2M terminal.

In step 309, the M2M gateway receives the data forwarding request which is sent by the M2M terminal in the domain and includes identification of the target M2M terminal, determines the target M2M terminal as an M2M terminal in the domain according to the identification of the target M2M terminal and directly forwards the service data to the target M2M terminal.

Here, the M2M gateway determines whether the target M2M terminal is an M2M terminal in the domain according to the identification of the target M2M terminal in the data forwarding request.

In step 309, if the M2M determines that the target M2M is not an M2M terminal in the domain according to the identification of the target M2M terminal, the M2M gateway reports the service data to the M2M platform which performs outside-domain forwarding.

In an exemplary embodiment, in order to enable the M2M application to conduct the same service operations on M2M terminals at the same time to reduce consumption of network resources and improve system operation efficiency, in step 304, the M2M platform retrieves basic data of M2M terminals which has authorized networking, according to the networking authorization information in the networking confirmation message sent from the M2M application, creates a group for M2M terminals having the same capability, and sends a group update message to the M2M application. The group update message includes group configuration information. The group configuration information includes identification assigned to the group, identification of group members and identification of the M2M gateway which the group is affiliated with. The M2M platform carries the group configuration information in the networking confirmation message and sends the networking confirmation message to the M2M gateway.

Accordingly, when the M2M application needs to conduct the same service operations on the M2M terminals having the same service capability at the same time, the M2M applications sends a group service request to the M2M platform according to the locally stored group configuration information. The group service request includes the identification of the group and the identification of the M2M gateway.

The M2M platform receives the group service request which is sent by the M2M application according to the group configuration information, and forwards the group service request to the M2M gateway. That is, the M2M platform forwards the group service request to the M2M gateway according to the identification of the M2M gateway in the group service request.

The M2M gateway receives the group service request which is sent by the M2M application and forwarded by the M2M platform, and according to group identification in the group service request, searching identification of group members from the locally stored group configuration information, and distributes the group service request to the group members. After receiving service responses fed by the group members, according to operation execution results indicated by the service response message, the M2M gateway processes the group service request distributed to the group members.

1) If the operation result indicates that the operation is performed successfully, the M2M gateway records the operation execution result of the group members.

2) If the operation result indicates that the operation is failed, the M2M resends the service request according to a resending policy.

The M2M gateway assembles service responses fed by the group members, and feeds the assembled group service response to the M2M application. The group service response includes an operation execution result indication, for example, success, failure, or no response.

After receiving the group service response fed by the M2M gateway, the M2M application parses the operation execution result as indicated by the response message, and processes the group service request according to the operation execution result.

Embodiments of the present disclosure further provide a third computer readable storage medium, including a set of instructions, which are configured to perform the method for establishing a stub network based on a Machine-to-Machine/Man (M2M) gateway according to the third embodiment.

Fourth Embodiment

Figure 4:
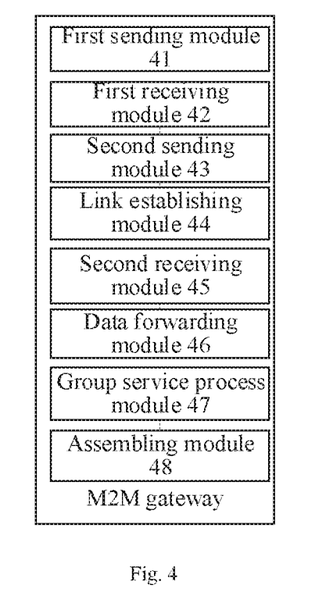
FIG. 4 is a block diagram showing an M2M gateway according to an embodiment of the present disclosure.

In order to implement the above methods, the embodiment of the present disclosure provides an M2M gateway. As shown in FIG. 4, the M2M gateway includes a first sending module 41, a first receiving module 42, a second sending module 43, a link establishing module 44, a second receiving module 45 and a data forwarding module 46.

The first sending module 41 is configured to sending a networking request to an M2M platform.

The networking request message may include identification of an M2M terminal which requests networking.

The first receiving module 42 is configured to receive a networking confirmation message sent from the M2M platform. The networking confirmation message includes networking authorization information.

The networking authorization information may include identification of an M2M terminal which has authorized networking and an authorization certificate.

The second sending module 43 is configured to send a domain-join request for joining a domain to an M2M terminal which has authorized networking according to the networking authorization information.

The link establishing module 44 is configured to receive a domain-join confirmation returned by the M2M terminal which has authorized networking and establish a link for the M2M terminal which has authorized networking.

The second receiving module 45 is configured to receive from an M2M terminal in the domain a data forwarding request which includes identification of a target M2M terminal.

The data forwarding module 46 is configured to determine the target M2M terminal as an M2M terminal in the domain according to the identification of the target M2M terminal, and directly forward service data to the target M2M target terminal.

The data forwarding module 46 is further configured to, if it is determined that the target M2M terminal is not an M2M terminal within the domain, report the service data to the M2M platform which performs outside-domain forwarding.

In an embodiment, the networking confirmation message further includes group configuration information of a group which is established by the M2M platform for M2M terminals having the same service capability. The group configuration information may include identification assigned to the group, identification of group members, and identification of the M2M gateway which the group is affiliated with.

Accordingly, the M2M gateway further includes a group service process module 47 configured to receive a group service request which is sent by the M2M application and forwarded by the M2M platform, and according to the group identification in the group service request, search identification of group members from the locally stored group configuration information, and distribute the group service request to the group members according to the found identification of the group members; and after receive service responses fed by the group members, according to operation execution results indicated by the service response message, process the group service request distributed to the group members.

1) If the operation result indicates that the operation is performed successfully, the M2M gateway records the operation execution result of the group members.

2) If the operation result indicates that the operation is failed, the M2M resends the service request according to a resending policy.

Here, the group service request includes the identification of the group and the identification of the M2M gateway.

The M2M gateway further includes an assembling module 48. The assembling module 48 is configured to assemble service responses fed by the group members, and feed the assembled group service response to the M2M application. The group service response includes an operation execution result indication, such as success, failure, or no response and the like.

Fifth Embodiment

Figure 5:
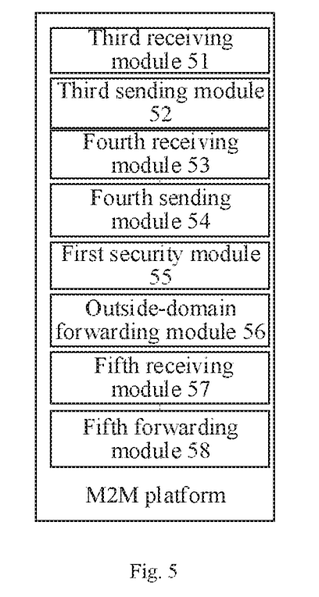
FIG. 5 is a block diagram showing an M2M platform according to an embodiment of the present disclosure.

The embodiment of the present disclosure provides an M2M platform. As shown in FIG. 5, the M2M platform includes a third receiving module 51, a third sending module 52, a fourth receiving module 53 and a fourth sending module 54.

The third receiving module 51 is configured to receive a networking request message sent from a M2M gateway.

The third sending module 52 is configured to forward the networking request message to an M2M application.

The fourth receiving module 53 is configured to receive a networking confirmation message sent from the M2M application. The networking confirmation message includes networking authorization information.

The fourth sending module 54 is configured to forward the networking confirmation message sent from the M2M application to the M2M gateway.

The M2M platform further includes a first security module 55 configured to perform authentication and authorization with respect to the M2M gateway after the networking request message from the M2M gateway is received.

In the embodiment, the M2M platform further includes an outside-domain forwarding module 56 configured to receive service data reported by the M2M gateway and perform outside-domain forwarding for the service data.

In an embodiment, the fourth receiving module 53 is further configured to, according to the networking authorization information in the networking confirmation message sent from the M2M application, retrieve basic data of M2M terminals which has authorized networking, create a group for M2M terminals having the same capability, and send a group update message to the M2M application. The update message includes group configuration information. The networking authorization information may include identification of an M2M terminal which has authorized networking and an authorization certificate. The group configuration information includes identification assigned to the group, identification of group members and identification of the M2M gateway which the group is affiliated with.

The fourth sending module 54 is further configured to carry the group configuration information in the networking confirmation message and send the networking confirmation message to the M2M gateway.

In addition, the M2M platform may further include:

a fifth receiving module 57 configured to receive a group service request which is sent by the M2M application according to the group configuration information; and a fifth sending module 58 configured to forward the group service request to the M2M gateway.

In practical applications, the functions of individual modules in the fourth and fifth embodiments may be realized by corresponding interfaces in combination with a central process unit (CPU), or a micro-processor (MPU), or a digital signal processor (DSP), or a Field Programmable Gate Array (FPGA) and the like.

Sixth Embodiment

Figure 6:
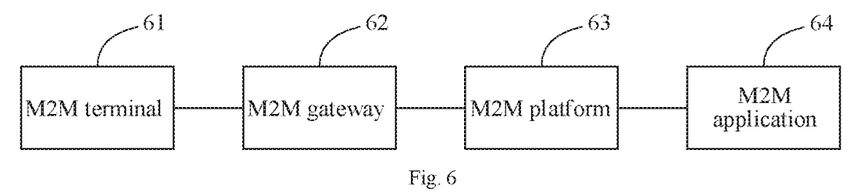
FIG. 6 is a system for establishing a stub network according to an embodiment of the present disclosure.

The embodiment of the present disclosure provides a system for establishing a stub network based on an M2M gateway. As shown in FIG. 6, the system includes an M2M terminal 61, an M2M gateway 62, an M2M platform 63, and an M2M application 64.

The M2M terminal 61 is configured to: check a domain-join request and send a domain-join confirmation to the M2M gateway 62; if it is needed to send service data to a target M2M terminal, send a data forwarding request to the M2M gateway 62. The data forwarding request includes identification of the target M2M terminal.

The M2M gateway 62 is configured to: send a networking request message to the M2M platform 63, send a domain-join request for joining a domain to the M2M terminal 61 which has authorized networking according to networking authorization information in the networking confirmation message, and after receive a domain-join confirmation, establish a link for the M2M terminal 61 which has authorized networking; receive from the M2M terminal 61 a data forwarding request which includes identification of the target M2M terminal, determine the target M2M terminal as an M2M terminal in the domain according to the identification of the target M2M terminal, and directly forward service data to the M2M target terminal.

The M2M platform 63 is configured to: forward the networking request message to the M2M application 64, and forward the networking confirmation message sent by the M2M application to the M2M gateway 62.

The M2M application 64 is configured to: send the networking confirmation message to the M2M platform 63. The networking confirmation message includes the networking authorization information. The networking authorization information may include identification of an M2M terminal which has authorized networking and an authorization certificate.

The M2M gateway 62 is further configured to, if it is determined that the target M2M terminal is not an M2M terminal in the domain according to the identification of the target M2M terminal, report service data to the M2M platform 63.

The M2M platform 63 is configured to, after the service data reported by the M2M gateway 62 is received, perform outside-domain forwarding for the service data.

In an embodiment, the M2M platform 63 is further configured to, according to the networking authorization information in the networking confirmation message sent from the M2M application 64, retrieve basic data of M2M terminals 61 which has authorized networking, creates a group for M2M terminals 61 having the same capability, and send a group update message to the M2M application 64. The update message includes group configuration information. The group configuration information includes identification assigned to the group, identification of group members and identification of the M2M gateway which the group is affiliated with. The M2M platform 63 carries the group configuration information in the networking confirmation message and sends the networking confirmation message to the M2M gateway 62.

Accordingly, the M2M application 64 is further configured to, when it is needed to conduct the same service operation on the M2M terminals 61 having the same service capability at the same time, send a group service request to the M2M platform 63 according to the locally stored group configuration information. The group service request includes the identification of the group and the identification of the M2M gateway 62.

The M2M platform 63 is further configured to receive the group service request which is sent by the M2M application 64 according to the group configuration information and forward the group service request to the M2M gateway 62. Here, the M2M platform 63 may forward the group service request to the M2M gateway 62 according to the identification of the M2M gateway 62 in the group service request.

The M2M gateway 62 is further configured to receive the group service request which is forwarded by the M2M platform 63, and according to group identification in the group service request, search identification of group members from the locally stored group configuration information, and distribute the group service request to the group members according to the found identification of the group members; and after receive service responses fed by the group members, according to operation execution results indicated by the service response message, process the group service request distributed to the group members.

1) If the operation result indicates that the operation is performed successfully, the M2M gateway records the operation execution result of the group members.

2) If the operation result indicates that the operation is failed, the M2M resends the service request according to a resending policy.

The M2M gateway 62 is further configured to assemble service responses fed by the group members, and feed the assembled group service response to the M2M application 64. The group service response includes an operation execution result indication, for example, success, failure, or no response.

The M2M application 64 is further configured to, after the group service response fed by the M2M gateway 62 is received, parse the operation execution result as indicated by the response message, and process the group service request according to the operation execution result.

The methods provided by embodiments of the present disclosure will be described in detail below with an example of a specific scenario.

Figure 7:
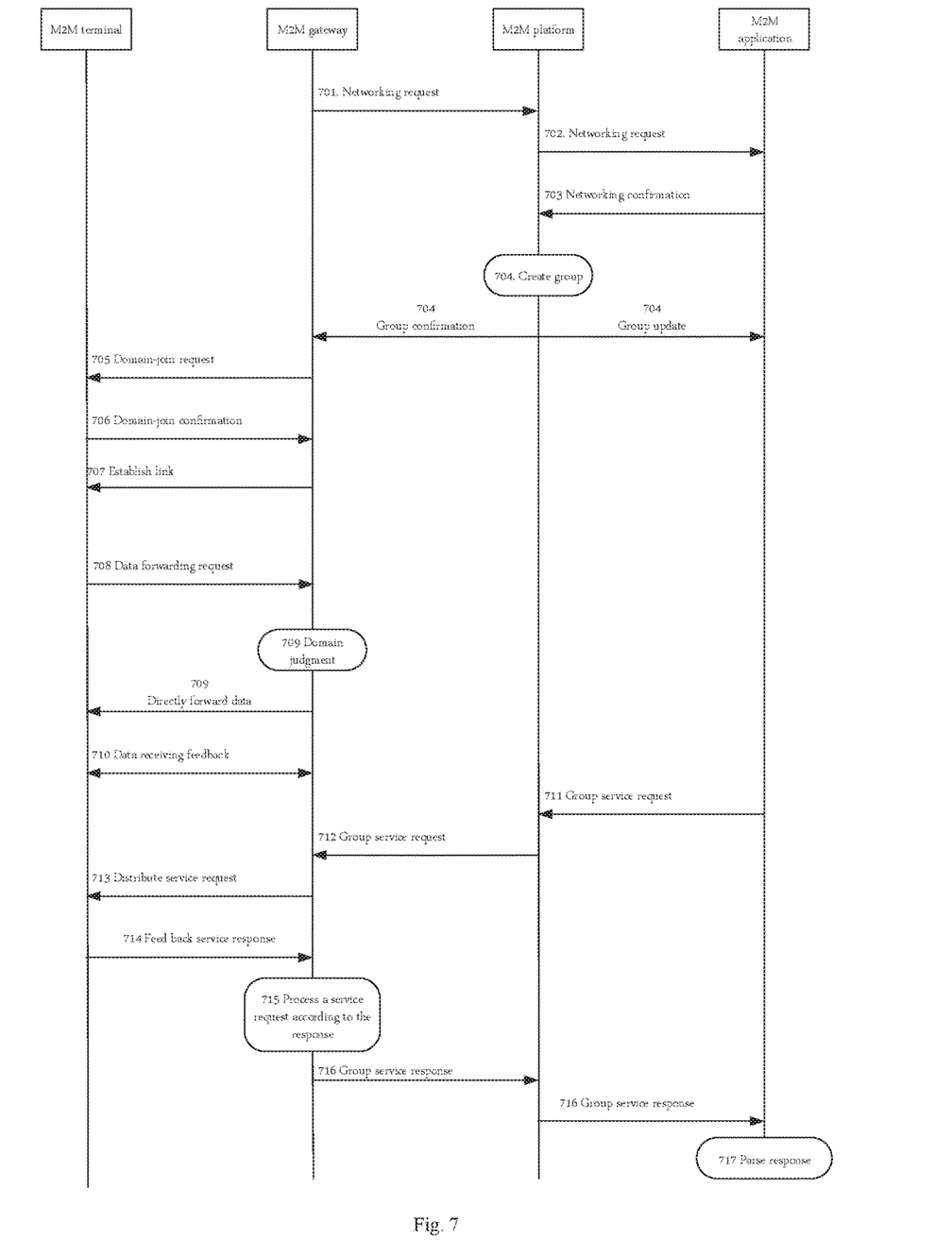
FIG. 7 is a flowchart showing a method for establishing a stub network based on an M2M gateway under a specific scenario according to an embodiment of the present disclosure.

As shown in FIG. 7, a method for establishing a stub network based on an M2M gateway may include the following steps.

In step 701, an M2M gateway sends a networking request message to an M2M platform. The networking request message may include identification of an M2M terminal which requests networking.

In step 702, after performing authentication and authorization on the M2M gateway, the M2M platform forwards the networking request to an M2M application.

In step 703, after performing authentication and authorization on the M2M gateway, the M2M application sends a networking confirmation message to the M2M platform. The networking confirmation message includes networking authorization information.

The networking authorization information may include identification of an M2M terminal which has authorized networking and an authorization certificate.

In step 704, according to the networking authorization information, the M2M platform retrieves basic data of M2M terminals which has authorized networking, creates a group for M2M terminals having the same capability, and sends a group update message to the M2M application. The update message includes group configuration information.

The group configuration information includes identification assigned to the group, identification of group members and identification of the M2M gateway which the group is affiliated with.

At the same time, the M2M platform sends a networking confirmation message to the M2M gateway. The networking confirmation message includes the networking authorization information and the group configuration information.

In step 705, the M2M gateway sends a domain-join request for joining a domain to an M2M terminal which has authorized networking according to the networking authorization information. The request may include an authorization certificate.

In step 706, the M2M terminal which has authorized networking checks the domain-join request, and sends a domain-join confirmation to the M2M gateway.

In step 707, the M2M gateway establishes a link for the M2M terminal which has authorized networking.

In step 708, if the M2M terminal in the domain needs to send service data to a target M2M terminal, the M2M terminal sends a data forwarding request to the M2M gateway. The data forwarding request includes identification of the target M2M terminal.

In step 709, the M2M gateway conducts a domain determination according to the identification of the target M2M terminal, i.e., the M2M gateway determines whether the target M2M terminal is an M2M terminal in the domain.

1) If the target M2M terminal is an M2M terminal in the domain, the M2M gateway directly forwards the service data to the target M2M terminal in the domain.

2) If the target M2M terminal is not an M2M terminal in the domain, the M2M gateway reports the service data to the M2M platform which performs outside-domain forwarding.

In step 710, the M2M gateway receives a data forwarding response fed by the target M2M terminal, and sends the response message to the M2M terminal in the domain.

In step 711, when it is needed to conduct the same service operation on the M2M terminals having the same service capability at the same time, the M2M application sends a group service request to the M2M platform according to the locally stored group configuration information. The request message may include the identification of the group and the identification of the M2M gateway.

In step 712, after conducting service authorization on the M2M application, the M2M platform forwards the group service request to the M2M gateway according to the identification of the M2M gateway.

In step 713, the M2M gateway, according to group identification, searches identification of group members from the locally stored group configuration information, and distribute the group service request to the group members.

In step 714, the group members execute the service request, and feed service response back to the M2M gateway. The response message may include the operation execution result indication, such as success, or failure and the like.

In step 715, after receiving service responses fed by the group members, according to operation execution results indicated by the service response message, the M2M gateway process the group service request distributed to the group members.

1) If the operation result indicates that the operation is performed successfully, the M2M gateway records the operation execution result of the group members.

2) If the operation result indicates that the operation is failed, the M2M resends the service request according to a resending policy.

In step 716, the M2M gateway assembles service responses fed by the group members, and feeds the assembled group service response to the M2M application. The response message includes an operation execution result indication, for example, success, failure, or no response.

In step 717, after the group service response fed by the M2M gateway is received, the M2M application parses the operation execution result as indicated by the response message, and processes the group service request according to the service logic.

Exemplary embodiments of the present disclosure have been described above; however, it is to be understood that these exemplary embodiments are not intended to limit the scope of the present disclosure. Any changes, equivalent substitutes and improvements within the spirit and principle of the present disclosure are encompassed in the scope of the present disclosure.

INDUSTRIAL APPLICABILITY

In embodiments of the present disclosure, the M2M gateway sends a networking request to an M2M platform; the M2M gateway receives a networking confirmation message sent from the M2M platform, the networking confirmation message includes networking authorization information; the M2M gateway sends a domain-join request for joining a domain to an M2M terminal which has authorized networking according to the networking authorization information, receives a domain-join confirmation returned by the M2M terminal which has authorized networking and establishes a link for the M2M terminal which has authorized networking; the M2M gateway receives from an M2M terminal in the domain a data forwarding request which includes identification of a target M2M terminal; the M2M gateway determines the target M2M terminal as an M2M terminal in the domain according to the identification of the target M2M terminal, and directly forwards service data to the target M2M target terminal. In this way, direct forwarding of service data between M2M terminals in a stub network may be realized using an M2M gateway, thereby improving system operation efficiency and meeting real-time requirements.

What is claimed is:

1. A method for establishing a stub network based on a Machine-to-Machine/Man (M2M) gateway, comprising:
   sending, by an M2M gateway, a networking request message to an M2M platform;
   receiving, by the M2M gateway, a networking confirmation message sent from the M2M platform, wherein the networking confirmation message comprises networking authorization information;
   sending, by the M2M gateway, a domain-join request for joining a domain to an M2M terminal which has authorized networking according to the networking authorization information;
   receiving, by the M2M gateway, a domain-join confirmation returned by the M2M terminal which has authorized networking and confirms to join the domain and establishing a link for the M2M terminal which has authorized networking;
   receiving, by the M2M gateway, from an M2M terminal in the domain a data forwarding request which comprises identification of a target M2M terminal; and
   determining, by the M2M gateway, the target M2M terminal as an M2M terminal in the domain according to the identification of the target M2M terminal, and directly forwarding service data to the target M2M target terminal.

2. The method according to claim 1, further comprising:
   if it is determined by the M2M gateway that the target M2M terminal is not an M2M terminal within the domain, reporting, by the M2M terminal, the service data to the M2M platform which performs outside-domain forwarding.

3. The method according to claim 1, wherein the networking confirmation message further comprises group configuration information of a group which is established by the M2M platform for M2M terminals having the same service capability.

4. The method according to claim 3, further comprising:
   receiving, by the M2M gateway, a group service request which is sent by an M2M application and forwarded by the M2M platform, and according to group identification in the group service request, searching identification of group members from the group configuration information, and distributing the group service request to the group members; and after receiving service responses fed by the group members, according to operation execution results indicated by the service response message, processing, by the M2M gateway, the group service request distributed to the group members.

5. The method according to claim 4, further comprising:
   assembling, by the M2M gateway, service responses fed by the group members, and feeding the assembled group service response to the M2M application, wherein the group service response comprises an operation execution result indication.

6. A first computer readable storage medium, comprising a set of instructions, which are configured to perform the method for establishing a stub network based on a Machine-to-Machine/Man (M2M) gateway according claim 1.

7. A Machine-to-Machine/Man (M2M) gateway, comprising:
   a processor; and
   a memory for storing instructions executable by the processor;
   wherein the processor is configured to:
   send a networking request message to an M2M platform;
   receive a networking confirmation message sent from the M2M platform, wherein the networking confirmation message comprises networking authorization information;
   send a domain-join request for joining a domain to an M2M terminal which has authorized networking according to the networking authorization information;
   receive a domain-join confirmation returned by the M2M terminal which has authorized networking and establish a link for the M2M terminal which has authorized networking;
   receive from an M2M terminal in the domain a data forwarding request which comprises identification of a target M2M terminal; and
   determine the target M2M terminal as an M2M terminal in the domain according to the identification of the target M2M terminal, and directly forward service data to the target M2M target terminal.

8. The M2M gateway according to claim 7, wherein the processor is further configured to, if it is determined that the target M2M terminal is not an M2M terminal within the domain, report the service data to the M2M platform which performs outside-domain forwarding.

9. The M2M gateway according to claim 7, wherein the networking confirmation message further comprises group configuration information of a group which is established by the M2M platform for M2M terminals having the same service capability; and
   the processor is further configured to receive a group service request which is sent by an M2M application and forwarded by the M2M platform, and according to group identification in the group service request, search identification of group members from the group configuration information, and distribute the group service request to the group members; and after receive service responses fed by the group members, according to operation execution results indicated by the service response message, process the group service request distributed to the group members.

10. The M2M gateway according to claim 9,
    wherein the processor is further configured to assemble service responses fed by the group members, and feed the assembled group service response to the M2M application, the group service response comprises an operation execution result indication.

* * * * *